United States Patent Office 3,489,736
Patented Jan. 13, 1970

3,489,736
POLYMERIZATION OF OLEFINS
Akira Takahashi, Kawasaki-shi, Isamu Yamazaki and Yoichi Toyama, Tokyo, Takashi Fujimaki, Yokohama, Yoshikiyo Kawabe, Kawasaki-shi, and Ichiro Ogino, Yokohama, Japan, assignors to Showa Denko Kabushiki Kaisha, Tokyo, Japan, a corporation of Japan
No Drawing. Filed Apr. 23, 1965, Ser. No. 450,518
Int. Cl. C08f 1/32, 3/02
U.S. Cl. 260—88.2                                    17 Claims

ABSTRACT OF THE DISCLOSURE

A process for the polymerization of olefins which comprises contacting an olefin with a catalyst of the composition comprising an organoaluminum nitrogen compound, an aluminum halogen compound, and a halide of transition metals.

---

The present invention relates to useful catalytic compositions for the polymerization of olefins and also to a process of manufacturing crystalline high polymers of olefins using said catalytic compositions. More particularly, the present invention relates to useful catalysts for the polymerization of olefins consisting of organoaluminum nitrogen compounds, Lewis acid type aluminum halides, and transition metal halides and also to a process of manufacturing crystalline high polymers of olefins using said catalysts.

Heretofore, many different polymers have been produced from olefins using a variety of catalysts. Low molecular weight polymers, however, are usually a viscous oil or wax, so that no particularly useful industrial applications have been opened for them. Nor are noncrystalline polyolefins, particularly those produced from olefins containing more than two carbon atoms, such as propylene and butene, of any industrial importance. Consequently the present invention relates to a process of manufacturing crystalline high polymers of olefins useful for the commercial production of films, fibers, shaped articles, etc.

Previously, it has been known that catalysts consisting of various organometallic compounds and transition metal halides have been useful in the manufacture of crystalline high polymers of olefins. Among said organometallic compounds, organoaluminum compounds have been most preferred. It is known that organoaluminum compounds such as trialkyl aluminum and dialkyl aluminum halides, in which at least two alkyl radicals are bonded to aluminum and the remaining substituent, if any, is halogen, provide useful catalytic compositions.

However, organoaluminum dihalides, in which only one alkyl radical is bonded to aluminum and the remaining substituents are halogen, and aluminum trihalides, in which all the substituents are halogen, being Lewis acid type compounds, could not form a catalyst useful in industrial production of crystalline high polymers of olefins when combined with transition metal halides. In other words, it is known that use of such catalysts in the polymerization of olefin containing more than two carbon atoms, for example propylene and butene-1, only results in small amounts of oily low molecular weight polymer, the mean molecular weight of said polymer being merely of the order of 1000. It is indeed admitted that when ethylene is contacted with sufficient amounts of a catalyst consisting of monoalkyl aluminum dihalide and transition metal compound for many hours, a high molecular weight polymer of ethylene can be obtained, though in small amounts (British Patent No. 799,823). Such catalysts, however, which provide such low catalytic activity have not obtained industrial utilization. On the other hand, little has been known about the use of catalysts that consist of transition metal compounds and organoaluminum nitrogen compounds, as later detailed, which contain nitrogen atoms directly bonded to aluminum. The aforementioned British patent indeed contains a description about the polymerization of ethylene using catalysts consisting of transition metal compounds and certain considerably limited types of organoaluminum nitrogen compounds. As clearly seen from the examples contained therein, however, said process was only capable of producing very small amounts of high polymer in spite of long hours of reaction. Consequently the process could hardly be deemed available for industrial application. Moreover, it was only when ethylene was selected as the monomer that said catalyst could produce any polymer. We have also confirmed that when olefins containing more than two carbon atoms, for example propylene and butene, were used, said catalyst could not produce any polymer whatsoever. Also the Italian Patent No. 601,433 refer to α-olefin polymerization using catalysts consisting of another set of a few organoaluminum nitrogen compounds and transistion metal compounds. Also in this case, the yield of crystalline high polymer was extremely small, and such catalysts were considered unusable from the practical point of view. In this regard, Pasquon, for instance, gives more detailed report in "Makromol. Chem. 61, 116, 1958." The forgoing previous inventions will be later described in comparison with the process of the present invention with reference to concrete examples.

The present invention provides a new, extremely useful catalyst adapted to industrial production of crystalline high polymers of olefins which consists of (a) organoaluminum nitrogen compounds, a few of which are known to develop considerably weak catalytic activity in combination with transition metal halides, (b) Lewis acid type aluminum halides which have never acted as catalysts for high polymerization or have only indicated industrially unusable catalytic function and (c) transition metal halide. It is unexpected that a combination of organoaluminum nitrogen compounds and Lewis acid type aluminum halides can provide a catalyst, when used with transition metal halides, possessing the characteristics and advantages as are later detailed. This is indeed a surprising fact.

As stated above, the catalyst of the present invention consists of (a) organoaluminum nitrogen compounds, (b) Lewis acid type aluminum halides and (c) transition metal halides.

More particularly, the catalyst of the present invention consists of the three components given below:

(a) Organoaluminum nitrogen compounds represented by the general formula

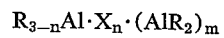

in which R is hydrocarbon radical containing not more than ten carbon atoms and X is a nitrogen-containing radical selected from the group consisting of (i) secondary amine radical of the formula

(ii) secondary diamine radical of the formula

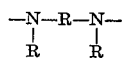

(iii) N-substituted amide radical of the formula

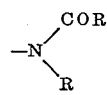

(iv) imide radical of the formula

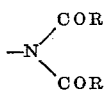

(v) N,N'-substituted diamide radical of the formula $$-\underset{\underset{R}{|}}{N}-CO-R-CO-\underset{\underset{R}{|}}{N}-$$

(vi) N,N'-substituted urea radical of the formula

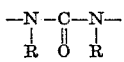

(vii) N-substituted urethane radical of the formula

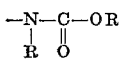

in which all R's are as given above, and in which any of the R's may be bonded to one another to form a closed ring containing N, and in which $n$ is an integer of 1 to 3, and $m$ is an integer indicated by the equation $m=p-n$, where $p$ represents the total number of N atoms present in the said organoaluminum nitrogen compound;

(b) Aluminum halogen compounds represented by the general formulae $R'AlY_2$ and $AlY_3$ in which $R'$ is hydrocarbon radical and Y is a halogen atom; and (c) Halides of transition metals of Groups IV, V and VI of the Periodic Table.

The component (a) of the aforementioned catalyst of the present invention, namely, the organoaluminum nitrogen compound, is a compound in which at least one nitrogen-containing radical is directly bonded to the aluminum through the N atom thereof, and, the remaining bonds of aluminum, if any, are filled with hydrocarbon radicals. The nitrogen-containing atomic radicals described above are derived by removing hydrogen from those compounds in which each nitrogen atom is bonded to just one hydrogen atom, such as secondary amines, secondary diamines, N-substituted amides, acid imides, NN'-substituted diamides, NN'-substituted urea and N-substituted urethane. A monovalent atomic group is derived from a compound containing a single nitrogen atom, and a divalent atomic group is derived from a compound containing two nitrogen atoms. The organoaluminum nitrogen compounds of the present invention are those in which all remaining bonds of said nitrogen-containing radicals are bonded to aluminum. This can be easily understood from the aforementioned general formula. A large number of compounds are included, each of which is determined by selection of said nitrogen-containing radicals. The particularly preferable types of the hydrocarbon radicals indicated by R in the aforementioned formulae are low molecular weight hydrocarbon radicals containing not more than ten carbon atoms, though the number is not specifically restricted. In this group are included alkyl radicals, aryl radicals, cycloalkyl radicals, aralkyl radicals, alkylene radicals and arylene radicals. Also, any of the R's may be bonded to one another to form a closed ring containing N.

As described above, in the formation of the catalyst of the present invention, any of the organoaluminum nitrogen compounds indicated by the aforementioned general formula can be advantageously used. The use of organoaluminum nitrogen compounds containing secondary amine radicals or secondary diamine radicals, preferably secondary diamine radicals, is excellent in that a catalyst of particularly high activity is obtained. Also, when organoaluminum compounds containing N-substituted amide radicals, imide radicals or NN'-substituted diamide radicals are used as the component (a), a catalyst suitable for the manufacture of highly crystalline polymers is obtained. Particularly, use of organoaluminum nitrogen compounds containing imide radicals or NN'-substituted diamide radicals is preferable since the production of highly crystalline polymers is obtained at sufficiently rapid rate. When organoaluminum nitrogen compounds containing NN'-substituted urea or NN'-substituted urethane radicals are used as the component (a), catalytic activity and the crystallinity and molecular weight of the polymer produced are adjustable over a wide range in accordance with the molar ratio of said component (a) used in relation to that of the components (b) and (c). Consequently, from the industrial point of view, the last mentioned may be the most preferable type of organoaluminum nitrogen compounds.

The component (a) of the catalyst used in the process of the present invention may be used not only in a refined pure state, but also as a synthesized crude product. For instance, a crude product containing organoaluminum nitrogen compounds which are obtained by reacting amine or amide compounds, corresponding to the desired amine or amide radicals, with the equivalent trialkyl aluminum can be directly used for the purpose of the present invention after separating unreacted alkyl aluminum by distillation without conducting any other refining process.

Listed below are typical practical examples of organoaluminum nitrogen compounds used as the component (a) of the catalyst of the present invention.

The following are those types of organoaluminum nitrogen compounds in which X of the general formula is a secondary amine radical.

N-(dimethylalumino)-dimethylamine,
N-(dimethylalumino)-dihexylamine,
N-(dimethylalumino)-methylethylamine,
N-(dimethylalumino)-methylhexylamine,
N-(dimethylalumino)-ethylhexylamine,
N-(dimethylalumino)-hexyloctylamine,
N-(diethylalumino)-dimethylamine,
N-(diethylalumino)-diethylamine,
N-(diethylalumino)-dibutyramine,
N-(diethylalumino)-methylpropylamine,
N-(diethylalumino)-methylbutyramine,
N-(diethylalumino)-ethylbutyramine,
N-(dipropylalumino)-dipropylamine,
N-(dibutyralumino)-methylpentylamine,
N-(dihexylalumino)-diethylamine,
N-(dihexylalumino)-methylpropylamine,
N-(dioctylalumino)-diethylamine,
N-(dioctylalumino)-methylethylamine,
N-(methylethylalumino)-dimethylamine,
N-(methylbutyralumino)-ethylhexylamine,
N-(ethylhexylalumino)-diethylamine,
N-(ethylhexylalumino)-ethylhexylamine,
N-(butyrhexylalumino)-dihexylamine,
N-(dimethylalumino)-diphenylamine,
N-(dimethylalumino)-dinaphthylamine,
N-(dimethylalumino)-phenyltolylamine,
N-(diethylalumino)-diphenylamine,
N-(diethylalumino)-ditolylamine,
N-(diethylalumino)-phenylnaphthylamine,
N-(methylpropylalumino)-diphenylamine,
N-(ethyloctylalumino)-phenyltolylamine,
N-(dimethylalumino)-methylphenylamine,
N-(diethylalumino)-methylphenylamine,
N-(diethylalumino)-ethylphenylamine,
N-(diethylalumino)-ethylnaphthylamine,
N-(diethylalumino)-methyl(p-methylphenyl)amine,
N-(dibutyralumino)-methylbenzylamine,
N-(dioctylalumino)-methylnaphthylamine,
N-(ethylpropylalumino)-methylphenylamine,
bis-(dimethylamino)-methylaluminum,
bis-(diethylamino)-methylaluminum,
(dimethylamino)-(diethylamino)-methylaluminum,
bis-(dimethylamino)-ethylaluminum,
bis-(diethylamino)-ethylaluminum,
bis-(methylethylamino)-ethylaluminum, (methylpropylamino)-(methylbutyramino)-ethyl-
 aluminum,
bis-(dimethylamino)-butyraluminum,
bis-(diethylamino)-butyraluminum,
(dipropylamino)-(dipentylamino)-butyraluminum,
bis-(dimethylamino)-hexylaluminum,
bis-(diethylamino)-octylaluminum,
tris-(dimethylamino)-aluminum,
tris-(diethylamino)-aluminum,
(diethylamino)-(methylethylamino)-(ethylbutyramino)-
 aluminum,
bis-(diphenylamino)-ethylaluminum,
tris-(diphenylamino)-aluminum,
bis-(methylphenylamino)-methylaluminum,
bis-(ethylphenylamino)-ethylaluminum,
bis-(methylbenzylamino)-octylaluminum,
tris-(methylphenylamino)-aluminum,
(dimethylamino)-(diphenylamino)-methylaluminum,
(dimethylamino)-(methylbenzylamino)-methyl-
 aluminum,
(diethylamino)-(ditolylamino)-methylaluminum,
(diethylamino)-(ethylphenylamino)-methylaluminum,
(dimethylamino)-(methylnaphthylamino)-ethyl-
 aluminum,
(diethylamino)-(1-piperidinyl)-ethylaluminum,
(diphenylamino)-(1-pyrrolidinyl)-ethylaluminum and
bis-(dimethylamino)-(diphenylamino)-aluminum.

The following list represents the organoaluminum nitrogen compounds in which X of the general formula is a secondary diamine radical.

NN'-bis-(dimethylalumino)-NN'-(dimethyl)-methylene-
 diamine,
NN'-bis-(dimethylalumino)-NN'-diethyl-methylene-
 diamine,
NN'-bis-(diethylalumino)-NN'-(dimethyl)methylene-
 diamine,
NN'-bis-(dimethylalumino)-NN'-(dimethyl)-ethylene-
 diamine,
NN'-bis-(diethylalumino)-NN'-(dimethyl)-ethylene-
 diamine,
NN'-bis-(dimethylalumino)-NN'-(diethyl)-hexamethyl-
 enediamine,
NN'-bis-(dimethylalumino)-NN'-(dimethyl)-hexamethyl-
 enediamine,
NN'-bis-(diethylalumino)-NN'-(diethyl)-hexamethylene-
 diamine,
NN'-bis-(dimethylalumino)-NN'-(dimethyl)-phenylene-
 diamine,
NN'-bis-(diethylalumino)-NN'-(dimethyl)-phenylene-
 diamine,
NN'-bis-(diethylalumino)-NN'-(diethyl)-phenylene-
 diamine,
NN'-bis-(dimethylalumino)-NN'-(diphenyl)-ethylene-
 diamine,
NN'-bis-(diethylalumino)-NN'-(diphenyl)-ethylene-
 diamine,
NN'-bis-(diethylalumino)-NN'-(diphenyl)-hexamethyl-
 enediamine,
NN'-bis-(diethylalumino)-NN'-(ditolyl)-ethylene-
 diamine,
NN'-bis-(dihexylalumino)-NN'-(dimethyl)-methylene-
 diamine,
NN'-bis-(dihexylalumino)-NN'-(diethyl)-methylene-
 diamine,
NN'-bis-(dihexylalumino)-NN'-(diphenyl)-methylene-
 diamine,
NN'-bis-(dihexylalumino)-NN'-(dimethyl)-ethylene-
 diamine,
NN'-bis-(dihexylalumino)-NN'-(diethyl)-ethylene-
 diamine,
NN'-bis-(dihexylalumino)-NN'-(dihexyl)-hexamethyl-
 enediamine and
NN'-bis-(dihexylalumino)-NN'-(diphenyl)-hexamethyl-
 enediamine.

Following are the organoaluminium nitrogen compounds in which X of the general formula is a N-substituted amide radical.

N-(dimethylalumino)-N-methylacetamide,
N-(dimethylalumino)-N-ethylacetamide,
N-(diethylalumino)-N-methylacetamide,
N-(diethylalumino)-N-methylpropionamide,
N-(diethylalumino)-N-methylbutyramide,
N-(diethylalumino)-N-ethylacetamide,
N-(diethylalumino)-N-ethylbenzamide,
N-(diethylalumino)-acetanilide,
N-(diethylalumino)-N-naphthylacetamide,
bis-(N-methylacetamido)-methylaluminum,
bis-(N-ethylacetamido)-ethylaluminum and
tris-(N-methylacetamido)aluminum.

Listed below are the organoaluminum nitrogen compounds in which X of the general formula is an imide radical.

N-(dimethylalumino)-diacetamide,
N-(diethylalumino)-diacetamide,
N-(dioctylalumino)-diacetamide,
N-(dimethylalumino)-dipropionamide,
N-(diethylalumino)-dipropionamide,
N-(dihexylalumino)dipropionamide,
N-(dimethylalumino)-dibenzamide,
N-(diethylalumino)-dibenzamide and
N-(dihexylalumino)-dibenzamide.

The organoaluminum nitrogen compounds in which X of the general formula is an N,N'-substituted diamide radical are given below.

NN'-(dimethylalumino)-NN'-dimethyl-oxalicdiamide,
NN'-(diethylalumino)-NN'-dimethyl-oxalic diamide,
NN'-(dimethylalumino)-NN'-diethyl-oxalic diamide,
NN'-(dihexylalumino)-NN'-dimethyloxalic diamide,
NN'-(dimethylalumino)-NN'-dimethyl-malonic diamide,
NN'-(diethylalumino)-NN'-dimethyl-malonic diamide,
NN'-(dimethylalumino)-NN'-diethyl-malonic diamide,
NN'-(diethylalumino)-NN'-diphenyl-malonic diamide,
NN'-(dihexylalumino)-NN'-dimethyl-malonic diamide,
NN'-(diethylalumino)-NN'-dimethyl-succinic diamide,
NN'-(dimethylalumino)-NN'-dimethyl-phthalic diamide,
NN'-(diethylalumino)-NN'-dimethyl-phthalic diamide,
NN'-(dimethylalumino)-NN'-dimethyl-maleic diamide,
NN'-(diethylalumino)-NN'-dimethyl-maleic diamide,
NN'-(diethylalumino)-NN'-diethyl-maleic diamide,
NN'-(dimethylalumino)-NN'-dimethyl-terephthalic
 diamide,
NN'-(diethylalumino)-NN'-dimethyl-terephthalic
 diamide,
NN'-(dimethylalumino)-NN'-dimethyl-adipo diamide,
NN'-(diethylalumino)-NN'-dimethyl-adipo diamide and
NN'-(diethylamino)-NN'-diphenyl-adipo diamide.

Following is the list of the organoaluminum nitrogen compounds in which X of the general formula is an N,N'-substituted urea radical.

NN'-bis-(dimethylalumino)-NN'-dimethylurea,
NN'-bis-(diethylalumino)-NN'-dimethylurea,
NN'-bis-(diethylalumino)-NN'-dimethylurea,
NN'-bis-(diethylalumino)-NN'-diethylurea,
NN'-bis-(dimethylalumino)-NN'-dihexylurea,
NN'-bis-(diethylalumino)-NN'-dihexylurea,
NN'-bis-(dimethylalumino)-NN'-diphenylurea,
NN'-bis-(diethylalumino)-NN'-diphenylurea and
N-(diethylalumino)-N'-(dioctylalumino)-N-methyl-N'-
 phenylurea.

The organoaluminum nitrogen compounds in which X of the general formula is an N-substituted urethane radical are listed below.

N-(dimethylalumino)-N-(methyl)-methylurethane,
N-(dimethylalumino)-N-(ethyl)-methylurethane,
N-(dimethylalumino)-N-(phenyl)-methylurethane, N-(diethylalumino)-N-(methyl)-ethylurethane,
N-(diethylalumino)-N-(ethyl)-ethylurethane,
N-(diethylalumino)-N-(phenyl)-ethylurethane and
bis-(N-ethyl-ethylurethane)-ethylaluminum.

The following are organoaluminium nitrogen compounds which contain two X's as shown in the general formula which respectively represent different types of radicals.

(dimethylamino)-(N-methylacetamido)-methyl-
  aluminum,
(diethylamino)-(N-methylacetamido)-methylaluminum,
(diethylamino)-(acetanilido)-methylaluminum,
(diethylamino)-(phthalimido)-methylaluminum,
(diethylamino)-(N-ethylacetamido)-ethylaluminum,
(diethylamino)-(diacetamido)-ethylaluminum,
(diethylamino)-(succinimido)-ethylaluminum,
bis-(diethylamino)-(N-methylacetamido)-aluminum,
(diethylamino)-bis-(N-methylacetamido)-aluminum,
(diethylamino)-bis-(acetanilido)-aluminum,
(diethylamino)-(diphenylamino)-(acetanilido)-
  aluminum and
(diethylamino)-(1-piperidyl)-(phthalimido)-aluminum.

The following are the organoaluminum nitrogen compounds in which the R's of the general formulas of the aforementioned radicals are bonded together to form a closed ring containing N.

N-(dimethylalumino)-piperidine,
N-(diethylalumino)-piperidine,
N-(dihexylalumino)-piperidine,
N-(dioctylalumino)-piperidine,
bis-(1-pyrrolidinyl)-methylaluminum,
bis-(1-piperidinyl)-ethylaluminum,
N-(dimethylalumino)-pyrrolidine,
N-(diethylalumino)-pyrrolidine,
N-(dihexylalumino)-pyrrolidine,
bis-(1-pyrrolidinyl)-methylaluminum,
bis-(1-pyrrolidinyl)-ethylaluminum,
bis-(1-pyrrolidinyl)-octylaluminum,
bis-(phthalimido)-methylaluminum,
bis-(succinimido)-ethylaluminum,
bis-(1-(2-oxo)-piperidinyl)-ethylaluminum,
tris-(1-(2-oxo)-pyrrolidinyl)-aluminum,
NN'-bis-(dimethylalumino)-imidazolidine,
NN'-bis-(dimethylalumino)-piperazine,
NN'-bis-(diethylalumino)-pyrazolidine,
NN'-bis-(diethylalumino)-piperazine,
N-(dimethylalumino)-phthalimide,
N-(dimethylalumino)-succinimide,
N-(diethylalumino)-phthalimide,
N-(diethylalumino)-maleinimide,
N-(diethylalumino)-succinimide,
NN'-bis-(diethylalumino-NN'-ethyleneurea,
NN'-bis-(diethylalumino)-NN'-trimethylene-urea,
N-(diethylalumino)-ε-caprolactam,
N-(diethylalumino)-δ-valerolactam and
N-(diethylalumino)-γ-butyrolactam.

The component (b) of the catalyst of the present invention, namely, the aluminum halogen compounds, are di- and trihalides of organoaluminum. Among particularly suitable examples are aluminum trihalides such as aluminum trichloride, aluminum tribromide and aluminum triiodide and lower alkyl aluminum dihalides such as methyl aluminum dichloride (dibromide or diiodide), ethyl aluminum dichloride (dibromide or diiodide) and propyl aluminum dichloride (dibromide or diiodide).

The component (c) of the catalyst of the present invention consists of halides of the transition metals of Groups IV, V and VI of the Mendelyeev's Periodic Table. Usually, halides of titanium, zirconium, vanadium, tungsten, molybdenum, etc. are effectively used. Among them, titanium halides are employed with particular preference. The following are some specific examples of such halides: titanium tetrachloride (tetrabromide and tetraiodide), titanium trichloride (tribromide and triiodide) and titanium dichloride (dibromide and diiodide). However, most suitable are titanium trichloride and titanium tetrachloride. The aforesaid transition metal halides include, for example, such transition metal halides as may be indicated by $TiCl_n \cdot MeCl_m$ (in which Me is metal), which are solid solutions of titanium halides with other metal halides. Particular preference is often given to a solid solution expressed by the formula $3TiCl_3 \cdot AlCl_3$.

The catalyst of the present invention is one consisting of a mixture of organoaluminum nitrogen compounds, aluminum halogen compounds and transition metal halides as above explained. These three components are indispensable to the present novel catalyst. When any two of them alone are used, the object of the present invention cannot be attained.

One of the outstanding characteristics of the present invention is that while the previously known ternary catalyst (U.S. Patent No. 2,969,345) consisting of alkyl aluminum dihalides, transition metal halides and basic compounds, for example, hexamethyl phosphor triamide, had to be used under the condition of strictly regulated molar ratios of those three components, the present invention makes it possible to change the molar ratio of the three components over a wide range. This means that the catalyst of the present invention is very easily handled and that it eliminates the necessity of selecting such very delicately regulated polymerizing conditions as have been required in the case of the previous ternary catalyst. Also, the catalyst of the present invention indicates a far larger polymerization reaction rate than the previous known ternary catalyst consisting of alkyl aluminum dihalides, transition metal halides and basic compounds. Moreover, when adequately selected, the catalyst of the present invention can produce olefin polymers of definitely higher crystallinity as compared with the polyolefins which have been manufactured by the use of the previously known binary catalyst consisting of a trialkyl aluminum or dialkyl aluminum halide and a transition metal halide.

As mentioned above, the relative proportions of the three components used in the catalyst of the present invention can be varied over a broad range. The molar ratio of organoaluminum nitrogen compounds to transition metal halides may be 0.1:1 or higher, but no practical advantages can be expected by using it at a higher ratio than 10:1. The particularly preferable range of the molar ratio is between 0.5:1 and 5.0:1. On the other hand, the percentage of Lewis acid type aluminum halides can be changed over a wide range. However, the molar ratio of said halides to transition metal halides usually ranges from 0.1:1 to 10:1.

The catalyst of the present invention consists of three components (a), (b) and (c) as above described. This catalyst develops many characteristics depending on the selection of said three components and the ratio in which they are used. The selection of these components and the decision of their ratio in use are made according to the kinds of olefins to be used or combinations thereof, the desired physical properties of the polymer produced and, further, the desires of producers based on the economic and local factors. The manufacturers can easily decide the foregoing conditions by making preliminary tests, if necessary.

The order in which the three components are added in preparing the catalyst of the present invention is subject to no particular restrictions. Consequently, as occasion calls, any optional method can be adopted for such addition. To cite a suitable example, organoalumino nitrogen compounds are first introduced, next Lewis acid type aluminum halides and last transition metal halides. However, other sequences are entirely unobjectionable. This operation can be performed conveniently in the atmosphere of inert gas or olefins to be polymerized at any temperatures from room temperature to polymerizing temperatures. Where required, one or more of the catalytic components may be added to the reactor dissolved or suspended in an adequate inert medium.

The olefins polymerized by the process of the present invention are lower aliphatic olefins including ethylene, propylene, butene-1, pentene-1, 4-methylpentene-1, hexene-1, and 3-methylhexene-1 and aromatic olefins such as styrene. However, ethylene, propylene, butene-1 and styrene are used with particular preference. According to the process in which the catalyst of the present invention is used, it is possible to manufacture crystalline homopolymers by polymerizing any one of the aforesaid olefins. Also, various types of copolymers can be produced by polymerizing a mixture of two or more kinds of olefin or by step-wise polymerization of two or more olefins.

The conditions under which olefins are conventionally polymerized are also applicable in the process of the present invention. Though subject to no particular limitation, this polymerization is suitably performed at temperatures between 10° and 150° C. and at pressures from 1 to 100 kg./cm.$^2$.

When olefin polymers are manufactured according to the process of the present invention, the molecular weight of polyolefins produced can be regulated by introducing, where desired, hydrogen into the reaction system. In other words, the greater the amounts of hydrogen introduced into the reaction system, the lower is the molecular weight of the polymer obtained. This situation will be more clearly understood with reference to the examples which follow. For instance, where polymers of excessively high molecular weight are likely to be produced as in polymerizing ethylene, the introduction of hydrogen is applied with particular advantage. However, high molecular polymers may be produced without using hydrogen. Furthermore, for the purpose of regulating the molecular weight, proper change of the relative molar ratio of the catalytic components is another effective means.

The polymerization according to the process of the present invention may be made in the presence or absence of inert organic liquid medium. For such inert organic liquid medium, aliphatic saturated hydrocarbons namely pentane, hexane, heptane, octane, isooctane and nonane or aromatic hydrocarbons such as benzene, toluene, xylene and ethylbenzene and any other media inert to olefins and the catalysts may be used. Depending on the circumstances, it is possible to use excess liquid olefins themselves as such a medium.

Polymerization by the process of the present invention may be made either by a non-continuous or batch operation or a continuous operation. Selection of the method of operating the process of the present invention is entirely at the option of those who will practice it.

The present invention will be more clearly understood with reference to the examples which follow. It should be noted, however, that the present invention is not limited to these examples.

EXAMPLE 1

A stainless steel autoclave of 1 liter capacity provided with a rotary stirrer was sufficiently purged with nitrogen. The vessel was charged with 200 g. of dehydrated and purified n-heptane. Then 0.064 g. of ethyl aluminum dichloride (in the molar ratio of 0.5 in relation to the titanium tetrachloride later introduced), 0.198 g. of N-(diethylalumino)-diethylamine (in the molar ratio of 2 in relation to the titanium tetrachloride later introduced), and 0.190 g. of titanium tetrachloride were added. The temperature was raised to 75° C. with stirring, and polymerization was carried out for 1 hour with the gauge pressure maintained at 4 kg./cm.$^2$ with addition of ethylene. The polymer produced was washed and purified with methanol. Upon drying, 97 g. of white powder polyethylene were obtained. The intrinsic viscosity [$\eta$] of this polymer indicated 12 in tetralin (tetrahydronaphthalene) at 130° C.

Reference Examples 1 and 2.—Polymerization was conducted in the same manner as in Example 1, except that N-(diethylalumino)-diethylamine was not added. After 1-hour reaction at 75° C., small amounts (0.9 g.) of oily matter with an intrinsic viscosity [$\eta$] of less than 1 were obtained. Polymerization was also carried out in the same manner as in Example 1, except that ethyl aluminum dichloride was not added, but N-(diethylalumino)-diethylamine and titanium tetrachloride alone were used. After 1-hour reaction at 75° C., no polymer whatsoever was observed.

EXAMPLE 2

A stainless steel autoclave of 1 liter capacity provided with a rotary stirrer was purged with nitrogen. The vessel was charged with 200 g. of n-heptane. Then 1.020 g. of N-(diethylalumino)-diethylamine, 0.825 g. of ethyl aluminum dichloride (molar ratio of 1.0) and 1.01 g. of titanium trichloride (in the equal molar ratio to ethyl aluminum dichloride) were added. The temperature was raised to 75° C. with stirring. Polymerization was performed for three hours while propylene was introduced under pressure in order to maintain the gauge pressure of 5 kg./cm.$^2$. The polymer produced was washed with methanol. Upon drying, 63.1 g. of white powder polypropylene were obtained. The intrinsic viscosity [$\eta$] of this polymer indicated 5.34 in Decalin at 135° C. The residue from extraction with boiling n-heptane was 91.0%. The infra-red absorption spectrum and the X-ray charts of the extraction residue showed that said product was highly crystalline polypropylene.

Reference Example 3.—This example proves that a binary system consisting of N-(diethylalumino)-diethylamine and titanium trichloride has no practical polymerizing catalytic function. In other words, when the experiment was made with the same materials and under the same conditions as in Example 2, except without ethyl aluminum dichloride, only 0.56 g. of solid polymer were obtained after three hours of polymerizing operation.

EXAMPLES 3 AND 4

Propylene was polymerized under the same operating conditions as in Example 2, except that the amount of N-(diethylalumino)-diethylamine used was changed. The results as shown in Table 1 below were obtained.

TABLE 1

| | | | | Physical Properties | |
| --- | --- | --- | --- | --- | --- |
| | Molar ratio of TiCl$_3$:Et$_2$N.AlEt$_2$:AlEtCl$_2$ | Polymerization time, hr. | Yield, g. | Intrinsic viscosity | Heptane extraction residue, percent |
| Example: | | | | | |
| 3 | 1:1.9:1 | 3 | 74.3 | 5.48 | 85.8 |
| 4 | 1:3.5:1 | 3 | 69.0 | 6.28 | 83.4 |

EXAMPLE 5

0.666 g. of titanium trichloride were mixed with N-(diethylalumino)-dioctylamine and ethyl aluminum dichloride respectively having an equal molar ratio to said titanium trichloride. With this catalyst, propylene was polymerized for 2.5 hours by the same method and under the same operating conditions as in Example 2 and 45 g. of solid high polymer were obtained. Its intrinsic viscosity was 7.08, and its heptane extraction residue was 87%.

EXAMPLE 6

Propylene was polymerized by the same method and under the same conditions as in Example 2, using the catalyst consisting of 0.580 g. of titanium trichloride, N-(diethylalumino)-methylphenyl amine and ethyl aluminum dichloride having molar ratios of 2 and 1 respectively in relation to said titanium trichloride. After 2 hours 50.2 g. of crystalline solid polymer were obtained.

EXAMPLE 7

Propylene was polymerized for 2.5 hours by the same method and under the same conditions as in Example 2, using the catalyst consisting of 0.596 g. of titanium trichloride and (N-diethylalumino)-piperidine and ethyl aluminum dichloride respectively having an equal molar ratio to said titanium trichloride. The yield was 58 g. of a solid polymer. Its intrinsic viscosity was 6.70, and its heptane extraction residue was 89.2%. This shows high crystallinity.

EXAMPLE 8

A stainless steel autoclave of 1 liter capacity provided with a rotary stirrer was purged with nitrogen, and then charged with 200 ml. of n-heptane, 0.813 g. of N,N'-bis-(diethylalumino)-N,N'-dimethylurea dissolved in heptane, 0.502 g. of aluminum trichloride and 0.980 g. of titanium trichloride were added. Thus the molar ratios of aluminum trichloride and titanium trichloride relating to N,N'-bis-(diethylalumino)-N,N'-dimethylurea were 1.2 and 2 respectively. While stirring, propylene was introduced under pressure to come in contact with the foregoing catalyst in such a manner that the temperature was maintained at 75° C. and the pressure at 5 kg./cm.$^2$ and polymerization was carried out for 2 hours. The polymer produced was treated and washed with methanol. Upon drying, 33.40 g. of white powder polypropylene were obtained. Its intrinsic viscosity was 5.54 in Decalin at 135° C. and its boiling n-heptane extraction residue was 92.86%. The infra-red absorption spectrum and X-ray charts of the polymer showed that it was highly crystalline polypropylene.

EXAMPLE 9

Propylene was polymerized and treated under the same conditions as in Example 8, using a catalyst consisting of 0.979 g. of diethylalumino diethylamine in place of the N,N'-bis-(diethylalumino)-N,N'-dimethylurea used in Example 8, aluminum trichloride and titanium trichloride having the molar ratios of 0.44 and 1 respectively in relation to said diethylalumino diethylamine. After two hours of polymerization 52.10 g. of a white solid polymer were obtained. The infra-red absorption spectrum and X-ray charts showed that the product was highly crystalline polypropylene.

When polymerization was performed for comparison under the same conditions except without aluminum trichloride, only 0.56 g. of a solid polymer were obtained after 3 hours.

EXAMPLE 10

Polymerization was carried out for 2 hours using a catalyst consisting of 1.005 g. (1 mol) of N-diethylalumino-N-methylacetamide in place of the N,N'-bis-(diethylalumino)-N,N'-dimethylurea used in Example 8, 0.354 g. (0.4 mol) of aluminum trichloride and 1.05 g. (1 mol) of titanium trichloride. The yield was 24.6 g. of a crystalline solid polymer. For comparison propylene was polymerized under the same conditions as in the foregoing operation, excepting that a mixture of titanium trichloride and N-(diethylalumino)-N-methylacetamide alone was used as a catalyst without aluminum trichloride. After 2 hours of polymerization 0.904 g. of solid polypropylene were obtained.

EXAMPLES 11 TO 14

Propylene was polymerized in the same manner as in Example 2, except that the catalyst used consisted of 0.620 g. of titanium trichloride, N-(diethylalumino)-N-methylacetamide in the amounts and molar ratios shown in the table below and ethyl aluminum dichloride was employed in an equal molar ratio to said titanium trichloride. After 2 hours of polymerization, highly crystalline polypropylene was obtained with the high yields as shown in Table 2 below.

TABLE 2

| | $TiCl_3$, g. | Molar ratio of N-(diethylalumino)-N-methylacetamide to $TiCl_3$ | Yield, g. | Heptane extraction residue, percent |
|---|---|---|---|---|
| Example: | | | | |
| 11 | 0.605 | 0.5 | 19.9 | 95.6 |
| 12 | 0.620 | 1.0 | 43.2 | 94.3 |
| 13 | 0.602 | 2.0 | 30.2 | 88.8 |
| 14 | 0.621 | 3.0 | 16.6 | 88.5 |

EXAMPLES 15–23

Polymerization was performed for 2 hours in the same manner as in Example 2 except that the kinds of organoaluminum nitrogen compounds were varied. Highly crystalline polypropylene was obtained in each case with the results shown in Table 3 below.

TABLE 3

| Example | Organoaluminum nitrogen compounds | Polymer yield, g. |
|---|---|---|
| 15 | N,N'-bis-(diethylalumino)-piperazine | 30.7 |
| 16 | N,N'-bis-(diethylalumino)-N,N'-diethylhexamethylenediamine | 40.0 |
| 17 | N-(diethylalumino)-acetanilide | 62.8 |
| 18 | N-(diethylalumino)-N-α-naphthylacetamide | 62.6 |
| 19 | N-(diethylalumino)-phthalimide | 30.0 |
| 20 | N,N'-bis-(diethylalumino)-N,N'-dimethylurea | 99.0 |
| 21 | N,N'-bis-(diethylalumino)-N,N'-diphenylurea | 43.4 |
| 22 | N,N'-bis-(diethylalumino)-ethyleneurea | 50.0 |
| 23 | N-phenyl-N-(diethylalumino)-ethylurethane | 90.0 |

NOTE.—In Examples 18 and 20 the component of organoaluminum nitrogen compounds was used in the molar ratio of 2 on the basis of the titanium trichloride used, and in all the other examples said compounds were employed in the molar ratio of 1.

EXAMPLE 24

One hundred cc. of refined heptane were introduced into a stainless steel autoclave of 500 cc. capacity. To this were added 0.996 g. of titanium trichloride and then dihexylalumino-dibutyl-amine and ethyl aluminum dichloride were introduced in such a manner that their respective proportions represented a molar ratio of 0.5 in relation to said titanium trichloride. While stirring, this catalyst was heated to 75° C., and propylene was polymerized for 1 hour with its pressure kept at 5 atm. The yield was 52.5 g. of white solid polypropylene. The intrinsic viscosity of this polymer was 4.60, and the isotacticity of the whole polymer as determined by infra-red absorption was 91%.

EXAMPLE 25

Propylene was polymerized in the same manner as in Example 24 except that 0.994 g. of titanium trichloride was used and that dihexyl-alumino-dibutyl-amine was replaced by tris-(dimethylamino)-aluminum. The yield was 6.2 g. of solid polypropylene. The isotacticity of this polymer by infra-red absorption was 93%.

EXAMPLE 26

A stainless steel autoclave was charged with 0.62 g. of titanium trichloride and ethyl aluminum dichloride and diethylalumino-methyl-acetamide which respectively had an equal molar ratio to said titanium trichloride. To this, 365 g. of liquified propylene were added. While stirring, the mass was heated to 60° C. and the pressure rose to 26 kg./cm.$^2$. After 100 minutes reaction was stopped, and unreacted propylene was vented off. The yield was 290 g. of solid polypropylene, its intrinsic viscosity being 14.2. Propylene was also polymerized under the same conditions except that 0.5 mol percent of hydrogen relating to the propylene was added. The viscosity of the polymer obtained was 4.0. The polymer obtained by the use of 1.0 mol percent of hydrogen had a viscosity of 2.23.

EXAMPLE 27

200 ml. of refined heptane were introduced into a stainless steel autoclave. To this 0.623 g. of titanium trichloride and ethyl aluminum dichloride and N,N'-bis-(diethylalumino)-N,N'-dimethylurea respectively having an equal molar ratio to said titanium trichloride were added. While stirring, the catalyst thus prepared was heated to 75° C. and ethylene was introduced for polymerization and the pressure maintained at 4 atm. After 1 hour, polymerization was stopped. Unreacted ethylene was released and 188.3 g. of white solid polyethylene were obtained. The intrinsic viscosity (in Tetralin at 130° C.) of this polyethylene was 14.1.

EXAMPLE 28

A stainless steel autoclave was charged with 200 ml. of refined heptane. To this, 0.632 g. of titanium trichloride and ethyl aluminum dichloride and diethylalumino-methylacetamide respectively having an equal molar ratio to said titanium trichloride were added. While stirring, the catalyst thus formed was heated to 75° C., and ethylene was introduced for polymerization and the pressure maintained at 4 atm. After 2 hours of polymerization, 190.5 g. of white solid polyethylene were obtained. The intrinsic viscosity (in Tetralin at 130° C.) of this polymer was 15.0.

EXAMPLE 29

200 ml. of heptane was introduced into an autoclave. To this 0.57 g. of titanium trichloride and ethyl aluminum dichloride and diethylalumino-diethylamine respectively having an equal and double molar ratio to said titanium trichloride were added. The catalyst thus prepared was heated to 75° C. and ethylene was introduced for polymerization and the pressure maintained at 4 atm. After 1 hour of polymerization, 102.8 g. of white solid polyethylene were obtained. The intrinsic viscosity (in Tetralin at 130° C.) of this polyethylene was 12.4. Polymerization was also conducted in the same manner except that hydrogen was additionally introduced to such an extent that its partial pressure was 1 atm. The intrinsic viscosity (in Tetralin at 130° C.) of polyethylene obtained was 2.40.

EXAMPLE 30

A stainless steel autoclave of 1 liter capacity was charged with 200 ml. of refined heptane. To this, 0.936 g. of titanium trichloride and ethyl aluminum dichloride and N,N'-bis-(diethylalumino)-N,N'-dimethylurea respectively having an equal molar ratio to said titanium trichloride were added. While stirring, the catalyst thus formed was heated to 85° C., and propylene was introduced for polymerization and the pressure maintained at 4.7 kg./cm.$^2$. Each time 7.71 g. of the propylene were consumed, 0.62 g. of ethylene was pressed into the reaction system for co-polymerization. After 6 cycles of such polymerization, the operation was stopped. The yield was 52.9 g. of a solid copolymer. This copolymer had an intrinsic viscosity of 3.86, yield strength of 200 kg./cm.$^2$ and tensile impact strength of 55 ft. lb./in.$^2$. Thus the copolymer gave considerably higher values as compared with the propylene homopolymer which had a tensile impact strength of 18 ft. lb./in.$^2$.

EXAMPLE 31

An autoclave was charged with 200 ml. of heptane. Further, 1.05 g. of titanium trichloride and ethyl aluminum dichloride and diethylalumino-methylacetamide respectively having an equal molar ratio to said titanium trichloride were added. While stirring, the catalyst was heated to 75° C., and propylene was introduced and polymerization continued with the pressure maintained at 4.7 kg./cm.$^2$. Each time 6.1 g. of the propylene was consumed, 0.41 g. of ethylene was pressed into the reaction system. After 8 cycles of such ethylene feed, reaction was stopped. The yield was 52.7 g. of a solid copolymer. This copolymer had an intrinsic viscosity of 5.64, tensile strength of 192 kg./cm.$^2$, yield strength of 286 kg./cm.$^2$ and tensile impact strength of 96 ft. lb./in.$^2$.

EXAMPLE 32

A stainless steel autoclave of 1 liter capacity was charged with 200 ml. of n-heptane. Then 1 millimole (0.190 g.) of titanium tetrachloride and ethyl aluminum dichloride and diethylalumino-diethylamine respectively having an equal and double molar ratio to said titanium tetrachloride were added. When the catalyst was heated to 75° C., ethylene was introduced for polymerization and maintained at 4 kg./cm.$^2$. After 1 hour of reaction, 55 g. of high molecular white polyethylene were obtained. The intrinsic viscosity of this polymer was about 10.

EXAMPLE 33–42

Polymerization was conducted in the same manner as in Example 32 except that the catalyst used consisted of 0.380 g. (2 millimoles) of titanium tetrachloride, 0.254 g. (2 millimoles) of ethyl aluminum dichloride and organoaluminum nitrogen compounds shown in Table 4 below. In each case, high molecular solid polyethylene was obtained with the yields indicated in said table.

TABLE 4

| Example | Organoaluminum nitrogen compounds | Polyethylene yield, g. |
|---|---|---|
| 33 | N-diethylalumino-di-n-butylamine | 41.2 |
| 34 | N-diethylalumino-piperidine | 62.0 |
| 35 | N-diethylalumino-methylphenylamine | 45.5 |
| 36 | N-diethylalumino-diphenylamine | 27.5 |
| 37 | N-diethylalumino-N-methylacetamide | 21.9 |
| 38 | N-diethylalumino-N-phenylacetamide | 26.1 |
| 39 | N-diethylalumino-phthalimide | 66.6 |
| 40 | N,N'-bis-(diethylalumino)-NN'-dimethylurea | 76.6 |
| 41 | N-diethylalumino-ε-caprolactam | 33.5 |
| 42 | N-diethylalumino-N-phenyl-ethylurethane | 70.5 |

EXAMPLE 43

A three-necked flask provided with a stirrer was purged with nitrogen, and then charged with 45 cc. of previously dehydrated heptane. Then, 8 millimoles of ethyl aluminum dichloride, 16 millimoles of N-diethylalumino-diethylamine and 8 millimoles of titanium trichloride were added. The contents of the flask were heated to 75° C., and 15 cc. of styrene were introduced. While stirring the mass, polymerization was carried out for 2 hours. The resultant crude polymer was washed with alcohol. Upon drying, white solid polystyrene was obtained with a yield of 63%. Some 89% of this solid polystyrene was insoluble in toluene at 15° C., showing the product to be a highly crystalline polymer.

Reference Example 4.—Styrene was polymerized in the same manner as in Example 43, except that the catalyst used lacked an organo-aluminum nitrogen compound and only consisted of 2.5 millimoles of ethyl-aluminum dichloride and 5 millimoles of titanium trichloride. Although white powder polystyrene was obtained with a yield of 85%, the product completely dissolved in toluene at 15° C., showing that it was a low crystalline polymer.

Reference Example 5.—Styrene was polymerized in the same manner as in Example 43, except that the catalyst used did not contain titanium trichloride, but only 4 millimoles of ethyl aluminum dichloride and 2 millimoles of N-diethylalumino-diethylamine were employed. After 30 minutes of reaction, a white powder polymer was obtained with a yield of 35%. This polymer was of low crystallinity and was completely dissolved in toluene at 15° C.

Having described the specification, we claim:

1. A process for the polymerization of olefins which comprises bringing at least one terminally unsaturated mono-olefins including styrene into contact with the catalyst formed by mixing:
   (a) an organoaluminum nitrogen compound represented by the general formula $$R_{3-n}Al \cdot X_n \cdot (AlR_2)_m$$

wherein R=hydrocarbon radical containing not more than 10 carbon atoms; X=nitrogen-containing radical selected from the group consisting of
   (i) secondary amine radical of the formula

(ii) secondary diamine radical of the formula

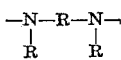

(iii) N-substituted amide radical of the formula

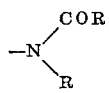

(iv) imide radical of the formula

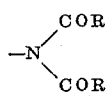

(v) N,N'-substituted diamide radical of the formula

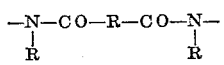

(vi) N,N'-substituted urea radical of the formula

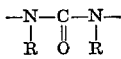

(vii) N-substituted urethane radical of the formula

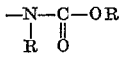

in which all R's are as given above, and in which any of the R's may be bonded to one other to form a closed ring containing N, and in which $n$ is an integer of 1 to 3 and $m$ is an integer indicated by the equation $m = p - n$, where $p$ represents the total number of N atoms present in the said organo-aluminum nitrogen compound,
   (b) an aluminum halogen compound represented by the general formulae $R'AlY_2$ and $AlY_3$ in which R' is hydrocarbon radical and Y is halogen atom, and
   (c) a halide of transition metals of Groups IV, V and VI of the Periodic Table wherein the molar ratio of catalytic components (a), (b), and (c) is 0.1–10:0.1–10:1.

2. The process according to claim 1 in which the component (a) of the catalyst is N-(diethylalumino)-diethylamine.

3. The process according to claim 1 in which the component (a) of the catalyst is N - (diethylalumino) - N - methylacetamide.

4. The process according to claim 1 in which the component (a) of the catalyst is N-(diethylalumino)-phthalimide.

5. The process according to claim 1 in which the component (a) of the catalyst is N,N'-bis-diethylalumino)-N,N'-dimethylurea.

6. The process according to claim 1 in which the component (a) of the catalyst is N-(diethylalumino)-ethylurethane.

7. The process according to claim 1 in which the component (b) of the catalyst is aluminum trichloride.

8. The process according to claim 1 in which the component (b) of the catalyst is ethyl aluminum dichloride.

9. The process according to claim 1 in which the component (c) of the catalyst is titanium tetrachloride.

10. The process according to claim 1 in which the component (c) of the catalyst is titanium trichloride.

11. The process according to claim 1 in which the olefins to be polymerized are one of the aliphatic α-olefins having 2 to 3 carbon atoms.

12. The process according to claim 1 which comprises bringing both ethylene and propylene as said olefins into contact with said catalyst.

13. The process according to claim 1 which comprises bringing said olefins into contact with said catalyst in the presence of hydrogen gas.

14. The process according to claim 1 which comprises polymerizing said olefins at temperatures 10 to 150° C., and at pressures 1 to 100 kg./cm.²

15. The process according to claim 1 which comprises polymerizing said olefins in the presence of chemically inert organic medium.

16. The process according to claim 1 which comprises polymerizing said olefins in the absence of chemically inert organic medium.

17. A catalyst comprising:
   (a) an organoaluminum nitrogen compound represented by the general formula $$R_{3-n}Al \cdot X_n \cdot (AlR_2)_m$$

wherein R=hydrocarbon radical containing not more than 10 carbon atoms; X=nitrogen-containing radical selected from the group consisting of
   (i) secondary amine radical of the formula

(ii) secondary diamine radical of the formula

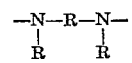

(iii) N-substituted amide radical of the formula

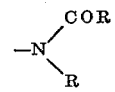

(iv) imide radical of the formula

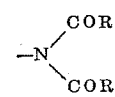

(v) N,N'-substituted diamide radical of the formula

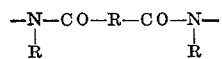

(vi) N,N'-substituted urea radical of the formula

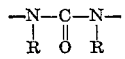

(vii) N-substituted urethane radical of the formula

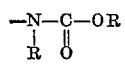

in which all R's are as given above, and in which any of the R's may be bonded to one other to form a closed ring containing N, and in which $n$ is an integer of 1 to 3 and $m$ is an integer indicated by the equation $m=p-n$, where $p$ represents the total number of N atoms present in the said organoaluminum nitrogen compound, (b) an aluminum halogen compound represented by the general formulae $R'AlY_2$ and $AlY_3$ in which $R'$ is hydrocarbon radical and Y is halogen atom, and (c) a halide of transition metals of Groups IV, V and VI of the Periodic Table.

References Cited

UNITED STATES PATENTS

| | | | |
|---|---|---|---|
| 3,050,471 | 8/1962 | Anderson | 252—429 |
| 3,147,240 | 9/1964 | Coover | 260—93.7 |
| 3,189,590 | 6/1965 | Coover | 260—93.7 |
| 3,245,976 | 4/1966 | Marconi | 260—94.3 |

JOSEPH L. SCHOFER, Primary Examiner

R. S. BENJAMIN, Assistant Examiner

U.S. Cl. X.R.

252—429, 431; 260—93.5, 93.7, 94.9 878